United States Patent
Choi et al.

(10) Patent No.: US 11,329,787 B2
(45) Date of Patent: May 10, 2022

(54) METHOD FOR TRANSMITTING AND RECEIVING SRS AND COMMUNICATION DEVICE THEREFOR

(71) Applicant: LG Electronics Inc., Seoul (KR)

(72) Inventors: Kukheon Choi, Seoul (KR); Jiwon Kang, Seoul (KR); Kyuseok Kim, Seoul (KR); Jonghyun Park, Seoul (KR); Kilborn Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 32 days.

(21) Appl. No.: 16/650,221

(22) PCT Filed: Sep. 28, 2018

(86) PCT No.: PCT/KR2018/011568
§ 371 (c)(1),
(2) Date: Mar. 24, 2020

(87) PCT Pub. No.: WO2019/066581
PCT Pub. Date: Apr. 4, 2019

(65) Prior Publication Data
US 2020/0280421 A1    Sep. 3, 2020

Related U.S. Application Data

(60) Provisional application No. 62/565,086, filed on Sep. 28, 2017.

(51) Int. Cl.
*H04L 5/00* (2006.01)
(52) U.S. Cl.
CPC .......... *H04L 5/0057* (2013.01); *H04L 5/0012* (2013.01); *H04L 5/0094* (2013.01)

(58) Field of Classification Search
CPC ................ H04L 5/0057; H04L 5/0012; H04L 5/0094; H04L 5/0048; H04L 5/0053; H04L 5/001; H04W 72/042
See application file for complete search history.

(56) References Cited

U.S. PATENT DOCUMENTS

2017/0302419 A1* 10/2017 Liu .................. H04L 5/0082
2018/0176937 A1*  6/2018 Chen ................ H04W 74/085
(Continued)

OTHER PUBLICATIONS $3^{rd}$ Generation Partnership Project; Huawei, HiSilicon; "Overview of bandwidth part," R1-1712153, 3GPP TSG RAN WG1, Prague, Czech Republic, dated Aug. 2017, 8 pages.
(Continued)

*Primary Examiner* — Shukri Taha
(74) *Attorney, Agent, or Firm* — Fish & Richardson P.C.

(57) ABSTRACT

A method for transmitting an SRS by a terminal may comprise the steps of: receiving, from a base station, information on a first bandwidth part (BWP) and a second BWP set for SRS transmission of the terminal; and when a frequency starting position for SRS transmission in the second BWP having a lower priority than the first BWP overlaps the first BWP, transmitting the SRS to the base station at an SRS bandwidth position different from an SRS bandwidth position associated with the frequency starting position for the SRS transmission. The UE is capable of communicating with at least one of another UE, a UE related to an autonomous driving vehicle, a base station or a network.

16 Claims, 15 Drawing Sheets

(56) References Cited

U.S. PATENT DOCUMENTS

2018/0331800 A1* 11/2018 Gao .................. H04W 74/0833
2019/0037562 A1* 1/2019 Park .......................... H04L 5/00
2020/0252180 A1* 8/2020 Takeda .................. H04W 72/04

OTHER PUBLICATIONS

3rd Generation Partnership Project; Huawei, HiSilicon; UL SRS design for beam management and CSI acquisition; R1-1712238; 3GPP TSG RAN WG1, Prague, Czech Republic, dated Aug. 2017, 12 pages.

3rd Generation Partnership Project; ZTE, Sanechips; "Discussion on SRS design for NR," R1-1715451, 3GPP TSG RAN WG1, Nagoya, Japan, dated Sep. 2017, 7 pages.

3rd Generation Partnership Project; CATT; "Remaining issues on SRS," R1-1715809, 3GPP TSG RAN WG1, Nagoya, Japan, dated Sep. 2017, 4 pages.

3rd Generation Partnership Project; Ericcson; "Details on SRS design," R1-1716374, 3GPP TSG-RAN WG1, Nagoya, Japan, dated Sep. 2017, 7 pages.

International Search Report in International Appln. No. PCT/KR2018/011568, dated Feb. 13, 2019, 25 pages (with English translation).

* cited by examiner

METHOD FOR TRANSMITTING AND RECEIVING SRS AND COMMUNICATION DEVICE THEREFOR

CROSS-REFERENCE TO RELATED APPLICATIONS

This application is a National Stage application under 35 U.S.C. § 371 of International Application No. PCT/KR2018/011568, filed on Sep. 28, 2018, which claims the benefit of U.S. Provisional Application No. 62/565,086, filed on Sep. 28, 2017. The disclosures of the prior applications are incorporated by reference in their entirety.

TECHNICAL FIELD

The present disclosure relates to wireless communication and, more particularly, to a method of transmitting and receiving a sounding reference signal (SRS) and a communication apparatus therefor.

BACKGROUND ART

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc.

DETAILED DESCRIPTION OF THE DISCLOSURE

Technical Problems

An object of the present disclosure is to provide a method of transmitting an SRS by a user equipment (UE).

Another object of the present disclosure is to provide a method of receiving an SRS by a base station (BS).

Another object of the present disclosure is to provide a UE for transmitting an SRS.

Another object of the present disclosure is to provide a BS for receiving an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of transmitting a sounding reference signal (SRS) by a user equipment (UE), including receiving information about a first bandwidth part (BWP) and a second BWP, configured for SRS transmission of the UE, from a base station (BS); and based on overlap between the first BWP and a frequency start position for the SRS transmission in the second BWP having a lower priority than the first BWP, transmitting the SRS to the BS in a different SRS bandwidth (BW) position from an SRS BW position related to the frequency start position for the SRS transmission.

The different SRS BW position may be related with an SRS BW position allocated in a previous SRS transmission instance. The different SRS BW position may be related with an SRS BW position to be allocated in an immediately next SRS transmission instance. The different SRS BW position may be related with an SRS BW position related to a new frequency start position for SRS transmission, calculated by applying a predetermined offset value to the frequency start position for the SRS transmission determined based on a frequency hopping pattern. The method may further include receiving information about the predetermined offset value from the BS.

In another aspect of the present disclosure, provided herein is a method of dropping sounding reference signal (SRS) transmission by a user equipment (UE), including receiving information about a first bandwidth part (BWP) and a second BWP, configured for SRS transmission of the UE, from a base station (BS); and based on overlap between the first BWP and a frequency start position for the SRS transmission in the second BWP having a lower priority than the first BWP, dropping the SRS transmission.

In another aspect of the present disclosure, provided herein is a method of receiving a sounding reference signal (SRS) by a base station (BS), including transmitting information about a first bandwidth part (BWP) and a second BWP, configured for SRS transmission of a user equipment (UE), to the UE; and based on overlap between the first BWP and a frequency start position for the SRS transmission in the second BWP having a lower priority than the first BWP, receiving the SRS from the UE in a different SRS bandwidth (BW) position from an SRS BW position related to the frequency start position for the SRS transmission.

The method may further include determining the frequency start position for the SRS transmission in the second BWP. The different SRS BW position may be related with an SRS BW position to be allocated in an immediately next SRS transmission instance or may be related with an SRS BW position to be allocated in an immediately next SRS transmission instance. The different SRS BW position may be related with an SRS BW position related to a new frequency start position for SRS transmission, calculated by applying a predetermined frequency start position offset value to the frequency start position for the SRS transmission.

The method may further include transmitting information about the predetermined frequency start position offset value to the UE. The method may further include, based on overlap between the first BWP and a frequency start position for the SRS transmission in the second BWP having a lower priority than the first BWP, allocating an SRS BW for the SRS transmission at the different SRS BW position from the SRS BW position related to the frequency start position for the SRS transmission.

In another aspect of the present disclosure, provided herein is a user equipment (UE) for transmitting a sounding reference signal (SRS), including a receiver configured to receive information about a first bandwidth part (BWP) and a second BWP, configured for SRS transmission of the UE, from a base station (BS); and a transmitter configured to transmit the SRS to the BS in a different SRS bandwidth (BW) position from an SRS BW position related to a frequency start position for the SRS transmission, based on overlap between the first BWP and the frequency start position for the SRS transmission in the second BWP having a lower priority than the first BWP.

In another aspect of the present disclosure, provided herein is a user equipment (UE) for dropping sounding reference signal (SRS) transmission, including a receiver configured to receive information about a first bandwidth part (BWP) and a second BWP, configured for SRS transmission of the UE, from a base station (BS); and a processor configured to drop the SRS transmission, based on overlap between the first BWP and a frequency start position for the SRS transmission in the second BWP having a lower priority than the first BWP.

In another aspect of the present disclosure, provided herein is a base station (BS) for receiving a sounding reference signal (SRS), including a transmitter configured to transmit information about a first bandwidth part (BWP) and a second BWP, configured for SRS transmission of a user equipment (UE), to the UE; and a receiver configured to receive the SRS from the UE in a different SRS bandwidth (BW) position from an SRS BW position related to a frequency start position for the SRS transmission, based on overlap between the first BWP and the frequency start position for the SRS transmission in the second BWP having a lower priority than the first BWP.

Advantageous Effects

According to embodiments of the present disclosure, an SRS may be more efficiently transmitted/received in an NR system having a wider bandwidth part than an LTE system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure. In the drawings.

BEST MODE FOR CARRYING OUT THE DISCLOSURE

Figure 1:
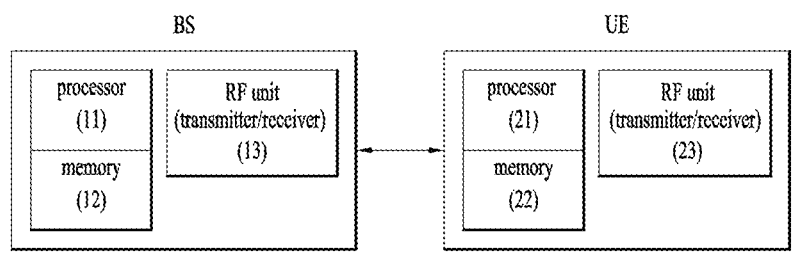
FIG. 1 is a diagram illustrating a wireless communication system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a wireless communication system for implementing the present disclosure.

Referring to FIG. 1, the wireless communication system includes a base station (BS) 10 and one or more UEs 20. On DL, a transmitter may be a part of the BS and a receiver may be a part of the UEs 20. On UL, the BS 10 may include a processor 11, a memory 12, and a radio frequency (RF) unit 13 (a transmitter and a receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (a transmitter and a receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be called a multiple input multiple output (MIMO) system.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

Layers of a radio interface protocol between the UE 20 and the BS 10 of the wireless communication system (network) may be classified into a first layer L1, a second layer L2, and a third layer L3, based on 3 lower layers of open systems interconnection (OSI) model well known in communication systems. A physical layer belongs to the first layer and provides an information transfer service via a physical channel. A radio resource control (RRC) layer belongs to the third layer and provides control radio resources between the UE and the network. The UE 10 and the BS 20 may exchange RRC messages with each other through the wireless communication network and the RRC layers.

Analog Beamforming

In a millimeter wave (mmW) system, since a wavelength becomes shorter, a plurality of antenna elements may be installed in the same area. That is, considering that the wavelength at a band of 30 GHz is 1 cm, a total of 64 (8×8) antenna elements may be installed in a 4*4 cm panel at intervals of 0.5 lambda (wavelength) in the case of a 2-dimensional array. Therefore, in the mmW system, it is possible to improve coverage or throughput by increasing beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

As an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 2A:
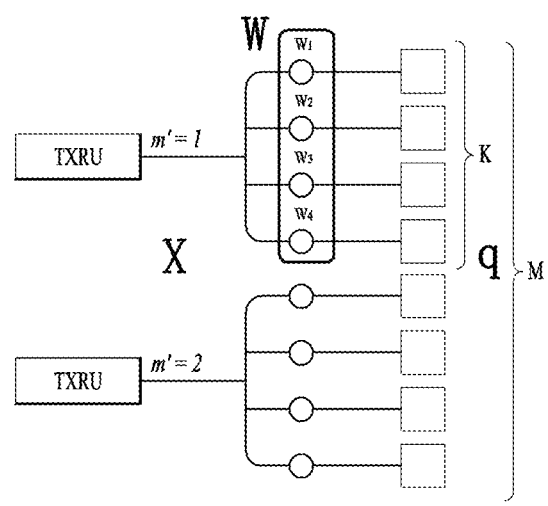
FIG. 2a is a view showing TXRU virtualization model option 1 (sub-array model) and FIG. 2b is a view showing TXRU virtualization model option 2 (full connection model)
Figure 2B:
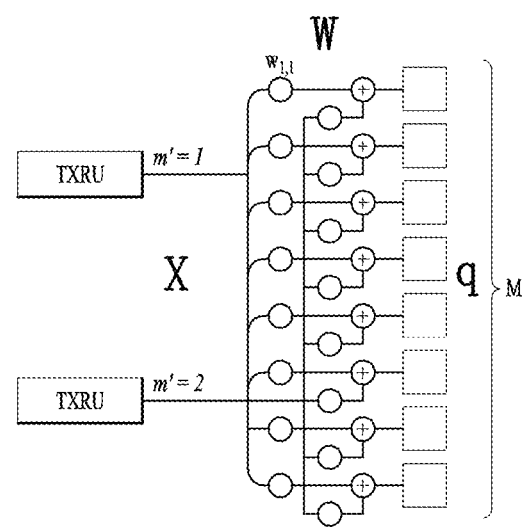

FIG. 2a is a view showing TXRU virtualization model option 1 (sub-array model) and FIG. 2b is a view showing TXRU virtualization model option 2 (full connection model).

FIGS. 2a and 2b show representative examples of a method of connecting TXRUs and antenna elements. Here, the TXRU virtualization model shows a relationship between TXRU output signals and antenna element output signals. FIG. 2a shows a method of connecting TXRUs to sub-arrays. In this case, one antenna element is connected to one TXRU. In contrast, FIG. 2b shows a method of connecting all TXRUs to all antenna elements. In this case, all antenna elements are connected to all TXRUs. In FIGS. 2a and 2b, W indicates a phase vector weighted by an analog phase shifter. That is, W is a major parameter determining the direction of the analog beamforming. In this case, the mapping relationship between CSI-RS antenna ports and TXRUs may be 1-to-1 or 1-to-many.

Hybrid Beamforming

Figure 3:
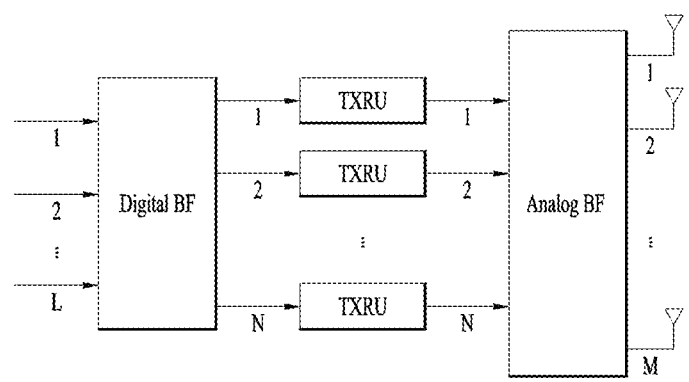
FIG. 3 is a block diagram for hybrid beamforming.

FIG. 3 is a block diagram for hybrid beamforming.

Figure 4:
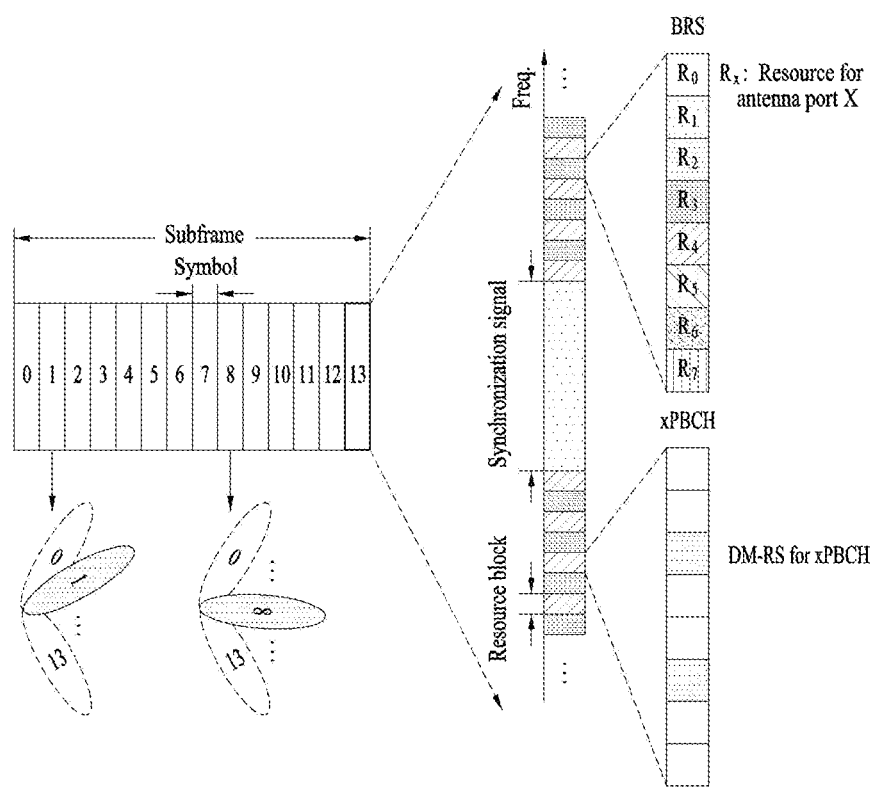
FIG. 4 is a view showing an example of beams mapped to BRS symbols in hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 4, the hybrid beamforming structure may be expressed by N transceivers (TXRUs) and M physical antennas. Digital beamforming for L data layers to be transmitted by a transmission side may be expressed by an N×L matrix, N digital signals are converted into analog signals through TXRUs and then analog beamforming expressed by an M×N matrix is applied.

FIG. 3 shows a hybrid beamforming structure in terms of the TXRUs and physical antennas. At this time, in FIG. 3, the number of digital beams is L and the number of analog beams is N. Further, in the new RAT system, a BS is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the BS uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

FIG. 4 is a view showing an example of beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Figure 5:
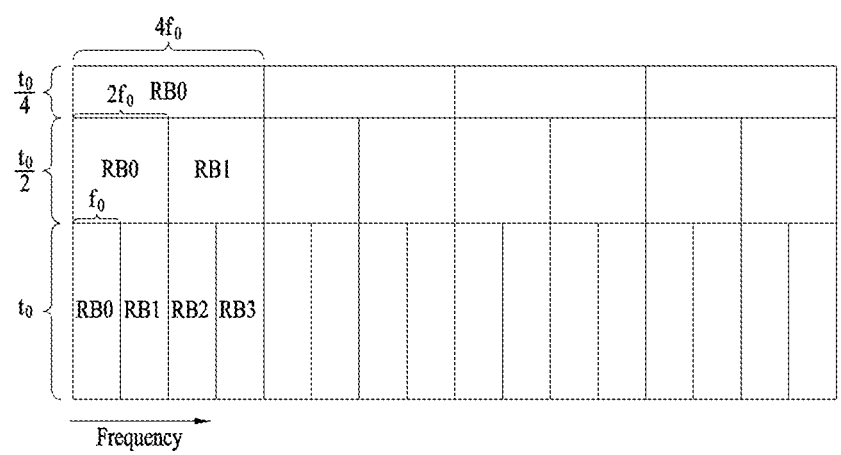
FIG. 5 is a view showing symbol/sub-symbol alignment between different numerologies.

FIG. 5 is a view showing symbol/sub-symbol alignment between different numerologies.

New RAT(NR) Numerology Characteristics

In NR, a method of supporting scalable numerology is being considered. That is, a subcarrier spacing of NR is (2n×15) kHz and n is an integer. From the nested viewpoint, a subset or a superset (at least 15, 30, 60, 120, 240, and 480 kHz) is being considered as a main subcarrier spacing. Symbol or sub-symbol alignment between different numerologies was supported by performing control to have the same CP overhead ratio.

In addition, numerology is determined in a structure for dynamically allocating time/frequency granularity according to services (eMMB, URLLC and mMTC) and scenarios (high speed, etc.).

Main agreement in new RAT is as follows.

A maximum bandwidth allocated per NR carrier is 400 MHz.

Details of up to 100 MHz are specified in standard specification Rel 15.

Scalable numerology is adopted. That is, 15 kHz*(2n) (15 to 480 kHz) is used.

One numerology has one subcarrier spacing (SCS) and one cyclic prefix (CP). Each SCS and CP are configured by RRC.

A subframe has a fixed length of 1 ms (a transmission time interval (TTI) is a unit of a slot (14 symbols), a mini-slot (in the case of URLLC), or a multi-slot depending on the SCS or purpose (e.g., URLLC), and the TTI is also configured by RRC signaling (one TTI duration determines how transmission is made on physical layer).

That is, all numerologies are aligned every 1 ms.

The number of subcarriers in each resource block (RB) is fixed to 12.

The number of symbols in a slot is 7 or 14 (in the case of an SCS lower than 60 kHz) and 14 (in the case of an SCS higher than 60 kHz).

Hereinafter, notations of parameters related to an SRS bandwidth (BW) configuration in the present disclosure will be described.

$C_{SRS}$: This indicates an SRS BW configuration as a cell-specific parameter srs-BandwidthConfig in the LTE/LTE-A system and may be given as one value among, for example, {0,1,2,3,4,5,6,7} (The UE may configure $C_{SRS}$ through higher layer signaling).

$C_{SRS\_NR}$: This indicates an SRS BW configuration in the NR system (The UE may configure $C_{SRS\_NR}$ through higher layer signaling).

$B_{SRS}$: This indicates information about SRS BW as a UE-specific parameter 'srs-Bandwidth' in the LTE/LTE-A system and may be given as one value among, for example, {0,1,2,3} (the UE may configure $B_{SRS}$ through higher layer signaling).

$B_{SRS\_NR}$: This indicates information about SRS BW as a UE-specific parameter 'srs-Bandwidth' in the NR system (the UE may configure $B_{SRS\_NR}$ through higher layer signaling).

$m_{SRS}$: This indicates a maximum SRS band in an SRS configuration.

$b_{hop}$: This indicates SRS hopping BW in the LTE/LTE-A system.

$b_{hop\_NR}$: This indicates SRS hopping BW in the NR system.

In NR, agreement as described in Table 1 below has been derived.

TABLE 1

Agreement:
  NR supports C_SRS and B_SRS to be UE-specifically configurable
For information for future discussions:
  For SRS bandwidth tables, at least the following design rules are used as a starting point:
    Single SRS bandwidth table (C_SRS is a row index into the SRS bandwidth table)
    4 values: of B_SRS (same as LTE)
    For BWP less than or equal to 96 PRBs, the table includes at least the LTE SRS bandwidths (next slide)
    For additional entries, at least the following rules are used:
      For every supported CC/[BWP] bandwidth with N PRBs, table contains at least one entry with SRS bandwidth m_SRS, 0 = floor(N/4)*4 PRB
        Support additional entries with m_{SRS, 0} = floor(N/4)*4 PRB for sounding flexibility
      To support intra-slot hopping within a BWP over 2 and 4 OFDM symbols:
        Table contains at least one entry with SRS bandwidth m_{SRS,0} = floor(N/16)*16 PRBs with N_1 = 2 and N_2 = 2
        Note: intra-slot hopping is subject to RAN4 feedback Table 1 above relates to agreement acknowledged for information about an SRS BW configuration. In a brief summary of Table 1, a single SRS BW table is used, $B_{SRS}$ has 4 candidates, which are the same as in LTE, and an LTE SRS BW table needs to be included for a bandwidth part (BWP) less than 96 RBs. 4 SRS BW entity values should be expressed as multiples of 4 RBs. N_1 and N_2, which are values for position indexes, are represented as N_1=2 and N_2=2, respectively, as at least one entry.

Basically, for the maximum number of RBs of one BWP, reference may be made to Table 2 below. Table 2 exemplarily shows the number of RBs in the NR system according to an SCS and a BWP.

TABLE 2

| SCS [kHz] | 5 MHz $N_{RB}$ | 10 MHz $N_{RB}$ | 15 MHz $N_{RB}$ | 20 MHz $N_{RB}$ | 25 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ | 200 MHz $N_{RB}$ | 400 MHz $N_{RB}$ |
|---|---|---|---|---|---|---|---|---|---|---|---|---|
| 15 | 25 | 52 | 79 | 106 | 133 | 216 | 270 | N.A | N.A | N.A | | |
| 30 | 11 | 24 | 38 | 51 | 65 | 106 | 133 | 162 | 217 | 273 | | |
| 60 | N.A | 11 | 18 | 24 | 31 | 51 | 65 | 79 | 107 | 135 | 264 | N.A |
| 120 | | | | | | | | | | | 132 | 264 |

Considering the contents of Table 2 above, the maximum number of RBs in the NR system according to one BWP may be up to 273. Therefore, the SRS BW configuration in the NR system requires an additional table capable of sounding up to at least 273 RBs. For example, if a table is configured based on the agreement of Table 1 above for a BWP of 273 RBs, Table 3 below may be included for the SRS of the NR system. Table 3 exemplarily shows an SRS BW configuration for the NR system in the case of a BWP of $260 < N_{RB}^{UL} \leq 280$ (i.e., BWP for the number of UL RBs which is greater than 260 and equal to or less than 280).

TABLE 3

| SRS bandwidth configuration | SRS-Bandwidth $B_{SRS\_NR} = 0$ | | SRS-Bandwidth $B_{SRS\_NR} = 1$ | | SRS-Bandwidth $B_{SRS\_NR} = 2$ | | SRS-Bandwidth $B_{SRS\_NR} = 3$ | |
|---|---|---|---|---|---|---|---|---|
| $C_{SRS}$ | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 272 | 1 | 136 | 2 | 68 | 2 | 4 | 17 |

The above example shows a sounding configuration when an SRS BW entry is a multiple of 4 RBs, N1=2, N2=2, and the maximum number of RBs is 272. The range of an SRS position related value N is disadvantageously increased.

Proposal 1 (SRS BW Configuration in NR System)

The first start entry of a tree-like structure in the SRS BW configuration of the NR system may be represented as a value greater than 4 RBs or as a multiple of 4 RBs (i.e., $m_{SRS,3}=4 \times x$). Here, x is a certain integer value. Table 4 below is a table generalizing the SRS BW configuration for the NR system according to Proposal 1.

TABLE 4

| SRS bandwidth configuration | SRS-Bandwidth $B_{SRS\_NR} = 0$ | | SRS-Bandwidth $B_{SRS\_NR} = 1$ | | SRS-Bandwidth $B_{SRS\_NR} = 2$ | | SRS-Bandwidth $B_{SRS\_NR} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| A | $z = 4 \times x \times y_1 \times y_2 \times y_3$ | 1 | $4 \times x \times y_2 \times y_3$ | $y_1$ | $4 \times x \times y_3$ | $y_2$ | $4 \times x$ | $y_3$ |

Here, y1, y2, and y3 denote values expressing SRS frequency positions and may be represented according to a BWP value. (For example, a multiple of 2, 3, and/or 5 or a certain prime number may be explicitly indicated in Table 4. However, z may not exceed a target BWP value. Here, x may be 1.)

As an embodiment, when a BWP is 273 RBs, Table 4 above may be indicated by Table 5 below (when x=2).

TABLE 5

| SRS bandwidth configuration | SRS-Bandwidth $B_{SRS\_NR} = 0$ | | SRS-Bandwidth $B_{SRS\_NR} = 1$ | | SRS-Bandwidth $B_{SRS\_NR} = 2$ | | SRS-Bandwidth $B_{SRS\_NR} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 272 | 1 | 136 | 2 | 8 | 17 | 8 | 1 |

In Table 5 above, when BW that a certain UE is capable of sounding is greater than 8 RBs, SRS BW may be configured using Table 5. That is, an SRS BW of 8 RBs may be represented by configuring $C_{SRS}=0$ and $B_{SRS\_NR}=3$.

Proposal 1-1 (Method of Setting x Value)

To set the x value in Table 4, a BS may UE-specifically set the x value based on a report on a UL sounding capability of the UE and transmit the x value to the UE. The BS may transmit the x value to the UE through higher layer signaling (L3 (radio resource control (RRC)) signaling), L2 (media access control (MAC)-control element (CE)), or L1 (downlink control information (DCI)).

As an embodiment, when a maximum BW that the UE is capable of performing SRS sounding is measured as 192 RBs, a minimum SRS BW is measured as 16 RBs, and the UE reports or transmits information about an SRS sounding capability to the BS, the BS may set the SRS BW configuration as the following table based on the SRS sounding capability of the UE.

Table 6 below exemplarily shows an SRS BW configuration for the NR system in the case of $180 < N_{RB}^{UL} \leq 200$ (i.e., BWP for the number of UL RBs which is greater than 180 and is equal to or less than 200).

TABLE 6

| SRS bandwidth configuration | SRS-Bandwidth $B_{SRS\_NR} = 0$ | | SRS-Bandwidth $B_{SRS\_NR} = 1$ | | SRS-Bandwidth $B_{SRS\_NR} = 2$ | | SRS-Bandwidth $B_{SRS\_NR} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | $192 = 48 \times x$ | 1 | $16 \times x$ | 3 | $8 \times x$ | 2 | $4 \times x$ | 2 |

In Table 6 above, the BS sets the x value to 4 (x=4) and informs the UE that x=4. Therefore, the UE may finally understand the contents of Table 7 below as the SRS bandwidth configuration and determine SRS BW according to $B_{SRS\_NR}$. Table 7 below exemplarily shows an SRS BW configuration for the NR system in the case of BWP of $180 < N_{RB}^{UL} \leq 200$ (i.e., BWP for the number of UL RBs which is greater than 180 and is equal to or less than 200) when x=4.

TABLE 7

| SRS bandwidth configuration | SRS-Bandwidth $B_{SRS\_NR} = 0$ | | SRS-Bandwidth $B_{SRS\_NR} = 1$ | | SRS-Bandwidth $B_{SRS\_NR} = 2$ | | SRS-Bandwidth $B_{SRS\_NR} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 192 | 1 | 64 | 3 | 32 | 2 | 16 | 2 |

When $B_{SRS\_NR}=0$, the SRS BW of the UE is 192 RBs.

As an embodiment, Table 8 below exemplarily shows an SRS (sounding) BW capability configuration.

TABLE 8

| SRS BW capability index | SRS-Bandwidth description | |
|---|---|---|
| | Max. possible sounding BW | Min. possible sounding BW |
| 0 | 120 RB | 4 RB |
| 1 | 128 RB | 4 RB |

TABLE 8-continued

| SRS BW capability index | SRS-Bandwidth description | |
|---|---|---|
| | Max. possible sounding BW | Min. possible sounding BW |
| 2 | 156 RB | 8 RB |
| 3 | 272 RB | 32 RB |

The UE may transmit information about an SRS BW capability (or information indicating the SRS BW capability) to the BS. As an example, the UE may transmit an SRS BW capability index to the BS as in Table 8. Upon receiving the SRS BW capability index, the BS may acquire information about a maximum possible sounding BW and a minimum possible sounding BW. For example, if the UE transmits the SRS BW capability index indicated as "2" to the BS, the BS may acquire information indicating that the maximum possible sounding BW is 156 RBs and the minimum possible sounding BW is 8 RBs, based on Table 8.

Proposal 1-2 (Transmission of Information about Sounding Capability)

For sounding flexibility, after specific $C_{SRS}$ and $B_{SRS}$ are configured for the UE, the UE may transmit information about a sounding capability to the BS. The BS uses a predefined default value as the x value until the information about the sounding capability is received from the UE. The BS may transmit this default value to the UE through higher layer (e.g., L3 RRC) signaling.

Proposal 1-3

For sounding flexibility, after specific $C_{SRS}$ and $B_{SRS}$ are configured for the UE, the BS may transmit an index $N_x$ indicating two or more x values (a subset of all x values) to the UE. If information about the sounding capability is provided or reported by the UE, the BS may provide a specific x value to the UE to provide an SRS BW configuration table capable of applying the sounding capability of the UE.

TABLE 9

| SRS bandwidth configuration | SRS-Bandwidth $B_{SRS\_NR} = 0$ | | SRS-Bandwidth $B_{SRS\_NR} = 1$ | | SRS-Bandwidth $B_{SRS\_NR} = 2$ | | SRS-Bandwidth $B_{SRS\_NR} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| A | $z = 4 \times N_x \times y_1 \times y_2 \times y_3$ | 1 | $4 \times N_x \times y_2 \times y_3$ | $y_1$ | $4 \times N_x \times y_3$ | $y_2$ | $4 \times N_x$ | $y_3$ |

The BS may set the $N_x$ value according to the sounding capability of a corresponding UE and transmit the $N_x$ value to the UE through L1 (DCI), L2 (MAC-CE), and/or L3 (RRC) signaling. As an embodiment, the $N_x$ value may be indicated as shown in Table 10 below.

TABLE 10

| x value subset index $N_x$ | SRS-Bandwidth flexibility value subset of x |
|---|---|
| 0 | {1, 2, 3, 4} |
| 1 | {1, 2, 4, 6} |
| 2 | {1, 2, 4, 8} |
| 3 | Reserved |

Hereinafter, the case in which sounding in the LTE system and sounding in the NR system collide in a band below 6 GHz will be described.

Proposal 2

For configuration of BW (e.g., above 96 RBs) greater than an LTE sounding RB, NR sounding BW may be configured using an LTE SRS BW configuration table and an NR SRS BW configuration table. That is, an SRS BW configuration of a certain UE is represented by a configuration combination of $C_{SRS}$, $C_{SRS\_NR}$, $B_{SRS}$, and/or $B_{SRS\_NR}$.

If $C_{SRS}$ and $C_{SRS\_NR}$ are configured together (including the case in which one configuration is linked with another configuration (e.g., $C_{SRS}$=a means $C_{SRS\_NR}$=b)), a BWP is valid in the range in which $C_{SRS\_NR}$ is configured.

If only $B_{SRS}$ is configured, SRS BW conforms to $B_{SRS}$.

If only $B_{SRS\_NR}$ is configured, SRS BW conforms to $B_{SRS\_NR}$.

If both $B_{SRS}$ and $B_{SRS\_NR}$ are simultaneously configured, SRS BW conforms to $B_{SRS}$ or $B_{SRS\_NR}$.

If only $C_{SRS}$ is configured, SRS BW conforms to $B_{SRS}$ and a BWP is valid in the range in which $C_{SRS}$ is configured.

If only $C_{SRS\_NR}$ is configured SRS BW is determined based on $B_{SRS\_NR}$ and a BWP is valid in the range in which $C_{SRS\_NR}$ is configured.

Table 11 below shows an SRS BW configuration in the LTE system in the case of a BWP of $80 < N_{RB}^{UL} \leq 110$ (i.e., BWP for the number of UL RBs which is greater than 80 and is equal to or less than 110). Table 12 shows an SRS BW configuration in the NR system in the case of a BWP of $180 < N_{RB}^{UL} \leq 200$ (i.e., BWP for the number of UL RBs which is greater than 180 and is equal to or less than 200).

TABLE 11

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 1 | 96 | 1 | 32 | 3 | 16 | 2 | 4 | 4 |

TABLE 12

| SRS bandwidth configuration | SRS-Bandwidth $B_{SRS\_NR} = 0$ | | SRS-Bandwidth $B_{SRS\_NR} = 1$ | | SRS-Bandwidth $B_{SRS\_NR} = 2$ | | SRS-Bandwidth $B_{SRS\_NR} = 3$ | |
|---|---|---|---|---|---|---|---|---|
| $C_{SRS\_NR}$ | $m_{SRS\_NR,0}$ | $N_0$ | $m_{SRS\_NR,1}$ | $N_1$ | $m_{SRS\_NR,2}$ | $N_2$ | $m_{SRS\_NR,3}$ | $N_3$ |
| 1 | 192 | 1 | 96 | 2 | 96 | 1 | 96 | 1 |

The NR SRS BW configuration table may indicate SRS BW for a BWP of $180 < N_{RB}^{UL} \leq 200$ as shown in Table 12 with respect to an independent configuration of $C_{SRS}$=1 and $C_{SRS\_NR}$=1 or $C_{SRS}$=1 ($C_{SRS\_NR}$ is implicitly configured in linkage with $C_{SRS}$). In this case, when the BS sets $B_{SRS\_NR}$ to 0, the UE may perform sounding of 192 RBs. As another example, the BS may set only $B_{SRS\_NR}$=0, without setting $B_{SRS}$=0, when $C_{SRS}$=1, so that the UE may perform sounding of 192 RBs. When the BWP is 200 RBs but SRS BW is 4, only $C_{SRS}$=1, $C_{SRS\_NR}$=1, and $B_{SRS}$=3 may be configured.

Figure 6:
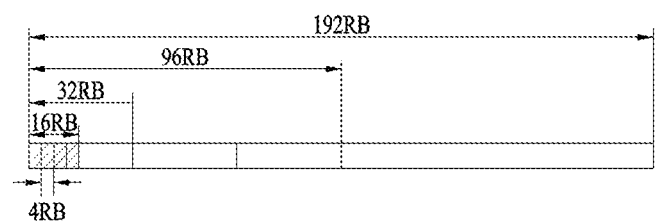
FIG. 6 is a diagram illustrating an example of a sounding grid (tree-like structure) according to linkage of Table 11 and Table 12.

FIG. 6 is a diagram illustrating an example of a sounding grid (tree-like structure) according to linkage of Table 11 and Table 12.

Proposal 2-1

To indicate the sounding (or SRS) BW table in the LTE system and the sounding BW table in the NR system as a tree-like structure (i.e., $m_{SRS\_NR,3}=m_{SRS,0}$) and perform SRS resource hopping, $b_{hop} \in \{0,1,2,3\}$ and $b_{hop\_NR} \in \{0,1,2,3\}$ and may be independently configured or one value of the two may be configured.

If only $b_{hop}$ is configured, frequency hopping is performed only for the SRS BW table of the LTE system.

If only $b_{hop\_NR}$ is configured, frequency hopping is performed only for the SRS BW table of the NR system.

If both $b_{hop}$ and $b_{hop\_NR}$ are configured, frequency hopping is performed for the case in which the SRS BW of the LTE system is a target NR BWP.

Figure 7:
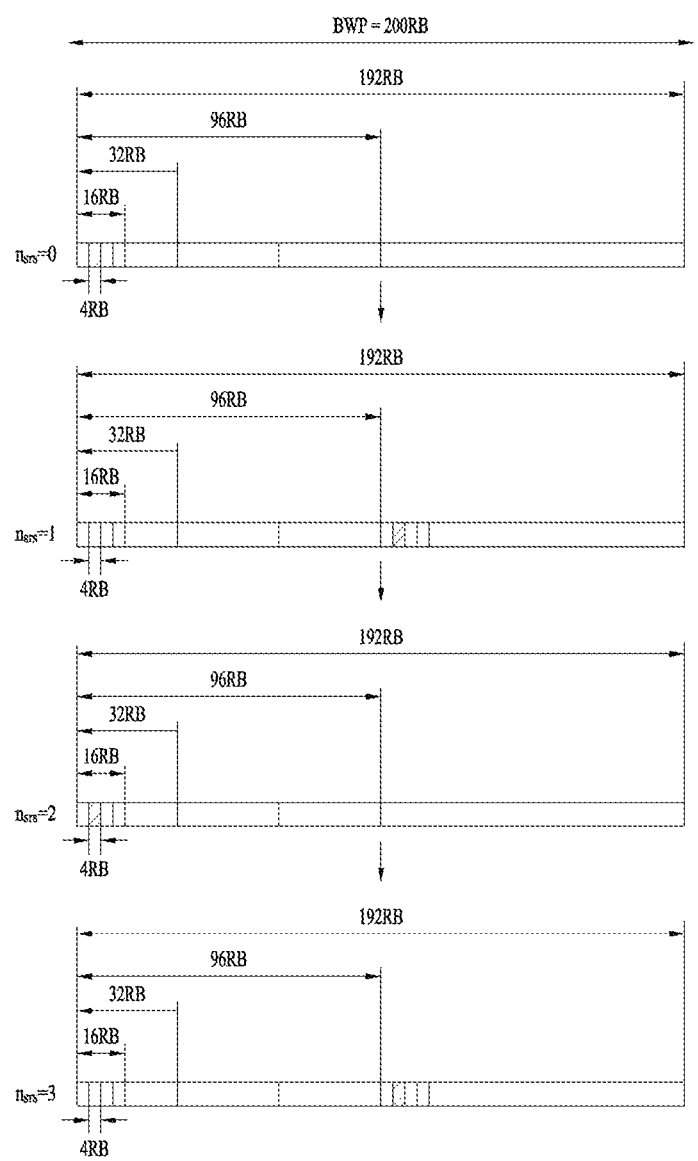
FIG. 7 is a diagram illustrating an example of disabling (frequency) hopping for an SRS BW of 4 RBs and LTE BW (within 96 RBs) and enabling (frequency) hopping for NR BW (above 96 RBs)

FIG. 7 is a diagram illustrating an example of disabling (frequency) hopping for an SRS BW of 4 RBs and LTE BW (within 96 RBs) and enabling (frequency) hopping for NR BW (above 96 RBs).

An embodiment will now be described with reference to FIG. 7. In Table 11 (LTE table) and Table 12 (NR table), it is assumed that a BWP is 200 RBs when $C_{SRS}$=1 and $C_{SRS\_NR}$=1. In this case, when $B_{SRS}$=3 and $B_{SRS\_NR}$=1 are configured and when $b_{hop}$=3 and $b_{hop\_NR}$=0, since both $b_{hop}$ and $b_{hop\_NR}$ have been configured, the UE may perform frequency hopping according to an SRS transmission instance with respect to an NR BWP of 200 RBs. For LTE SRS BW, since frequency hopping is disabled according to a hopping condition (i.e., hopping operation when $b_{hop} < B_{SRS}$) and, for NR SRS BW, since frequency hopping is enabled according to a hopping condition (i.e., hopping operation when $b_{hop\_NR} < B_{SRS\_NR}$), frequency hopping may be performed according to the SRS transmission instance as illustrated in FIG. 7.

Proposal 2-2 (Case in which BWP B and BWP a for SRS Transmission at Least Partially Overlap)

SRS transmission collision may occur during frequency hopping between UEs having different $C_{SRS}$ and/or $C_{SRS\_NR}$ (particularly, UEs having PRBs which may partially or completely collide during hopping due to an SRS BW table rather than a tree-like structure). To avoid such collision, the BS may configure the UEs with different parameter sets (e.g., different transmission combs (TCs), different TC offsets, or different cyclic shifts (CSs)).

Proposal 2-3 (Case in which BWP B and BWP a for SRS Transmission at Least Partially Overlap)

As an example, when BWP A is greater than other BWP B and BWP B depends on BWP A (i.e., A∪B=A as a relationship of a set), SRS BW may be allocated to certain UEs in BWP A and to certain other UEs in BWP B. If a value indicating a sounding frequency start position is $\overline{k}_0^{(p)}$, UEs to which the SRS BW is allocated in BWP A and BWP B may have the same value of $\overline{k}_0^{(p)}$ or a sounding start position of a less BWP (i.e., BWP B) may be configured to be equal to a sounding starting position in a greater BWP (i.e., BWP A) (i.e., $k_0^{(p)}$). Hereinafter, a sounding start position, a start position, and an SRS frequency start position may indicate a start position in the frequency domain of the SRS.

Figure 8:
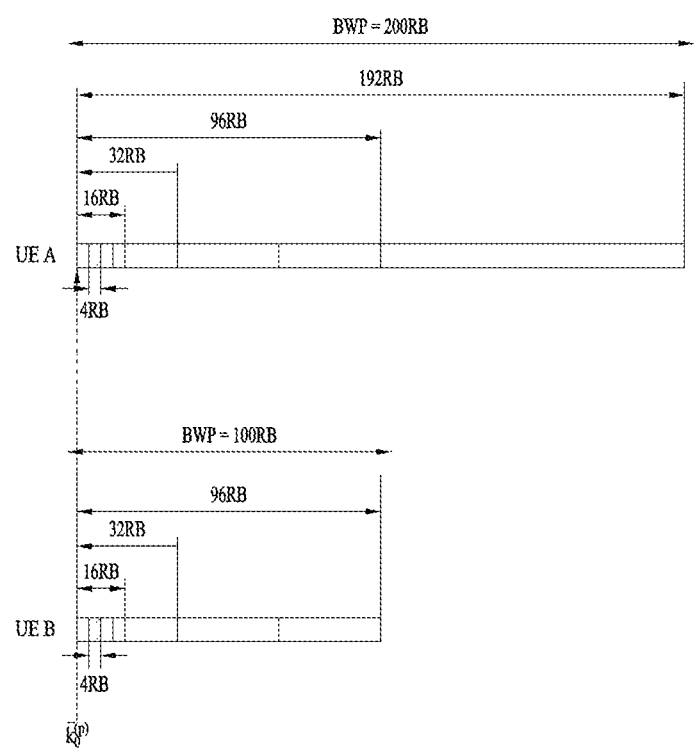
FIG. 8 is a diagram illustrating alignment of sounding start points of UEs having a BWP of 200 RBs and a BWP of 100 RBs.

FIG. 8 is a diagram illustrating alignment of sounding start points of UEs having a BWP of 200 RBs and a BWP of 100 RBs.

FIG. 8 illustrates an example of aligning the sounding start points to $\overline{k}_0^{(p)}$ as an embodiment. In a structure in which at least a part of BWPs overlap between UE A (BWP of 200 RBs) and UE B (BWP of 100 RBs), a start position (start position in the frequency domain of the SRS) for UE A (BWP of 200 RBs) may be calculated based on Equation 1 below.

$$\bar{k}_0^{(p)} = (\lfloor N_{RB}^{UL}/2 \rfloor - m_{SRS,0}/2) N_{SC}^{RB} + k_{TC}^{(p)}$$ [Equation 1]

Accordingly, the start position for UE B (BWP of 100 RBs) is set to $\bar{k}_0^{(p)}$. If the SRS BW structures of the two UEs (UE A and UE B) are tree-like structures, SRS transmission does not collide during frequency hopping.

Figure 9:
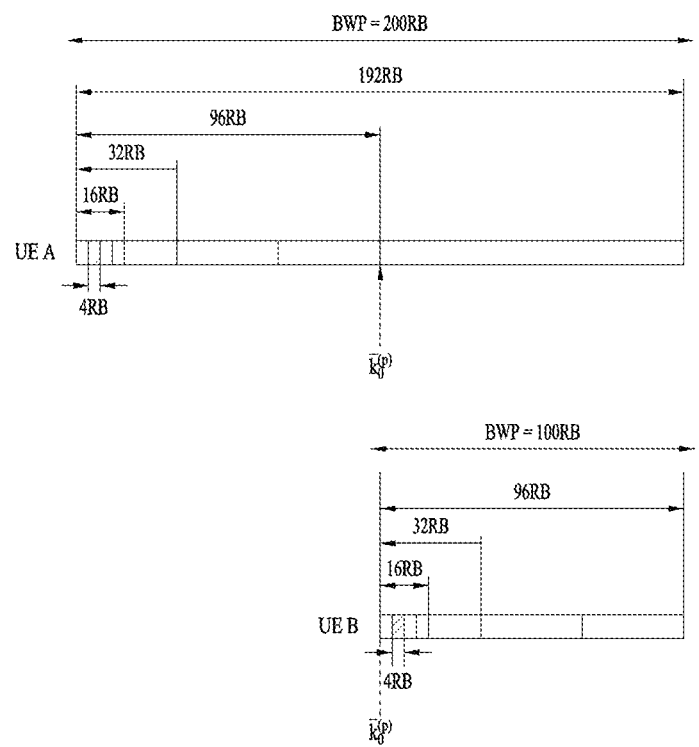
FIG. 9 is a diagram illustrating alignment between $k_0^{(p)}$ in a BWP of 200 RBs and $\bar{k}_0^{(p)}$ in a BWP of 100 RBs.

FIG. 9 is a diagram illustrating alignment between $k_0^{(p)}$ in a BWP of 200 RBs and $\bar{k}_0^{(p)}$ in a BWP of 100 RBs.

Considering that Proposal 2-1 (tree-like structure between the LTE SRS BW table and the NR SRS BW table) and Proposal 2-3 (alignment of sounding start points) serve to prevent collision during frequency hopping between UEs having different BWPs, the following sounding BW configuration may be given as an embodiment.

Figure 10:
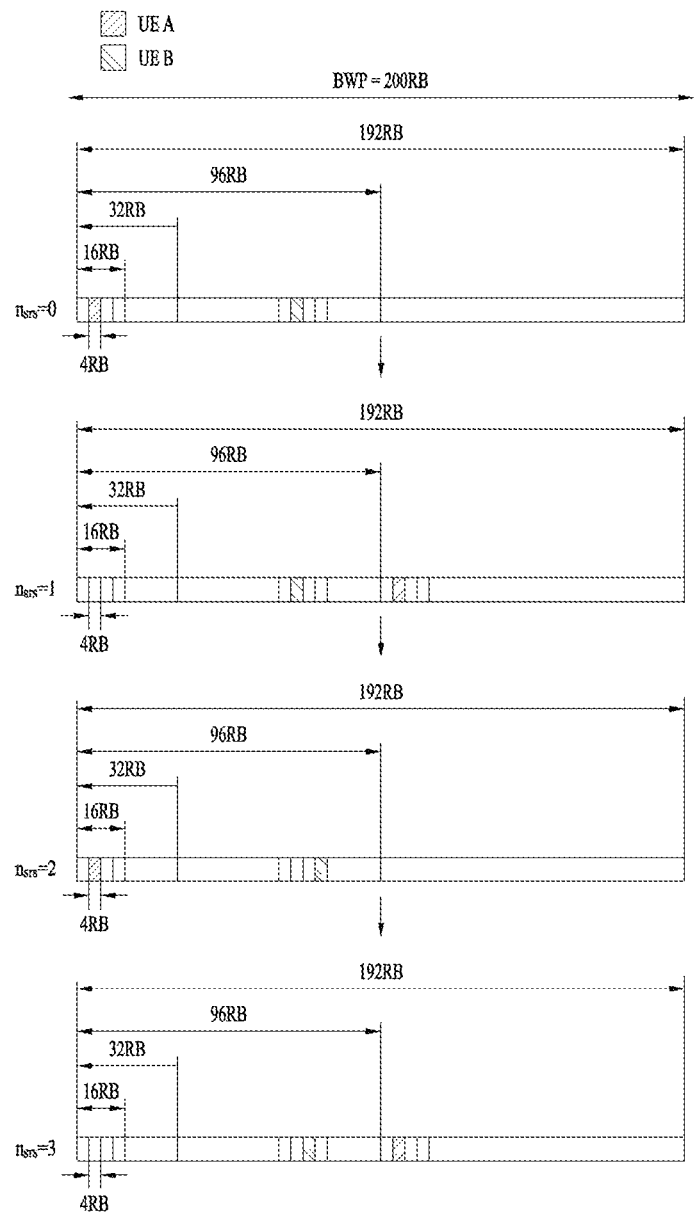
FIG. 10 is a diagram illustrating sounding between UEs having an SRS BWP of 200 RBs and an SRS BWP of 100 RBs.

FIG. 10 is a diagram illustrating sounding between UEs having different SRS BWPs, i.e., an SRS BWP of 200 RBs and an SRS BWP of 100 RBs.

In Table 11 and Table 12, if UE A is set to have $B_{SRS}=3$, $B_{SRS\_NR}=1$, $b_{hop}=3$, $b_{hop\_NR}=0$, $\bar{k}_0^{(p)}=0$ in a BWP of 200 RBs, and UE B is set to have $B_{SRS}=3$, $b_{hop}=2$, $\bar{k}_0^{(p)}=0$ in a BWP of 100 RBs, frequency hopping may occur (may be performed) in an SRS transmission instance as illustrated in FIG. 10.

Proposal 2-4 (Case in which at least a partial region of BWP B and BWP A overlaps)

Here, if a BWP is configured for UE(s), UE(s) connected to a corresponding cell may receive, from the BS, information as to BWPs allocated to the UE during initial access partially or totally overlap with other BWPs and information about an overlapping region or may be implicitly aware of whether BWPs partially or totally overlap through a BWP configuration of the BS.

Various Options of Predefined Rule

As an example, when BWP A is greater than BWP B and BWP B depends on BWP A (i.e., A∪B=A), if SRS BW is allocated to certain UE(s) (first UE(s)) in BWP A and to certain other UE(s) (second UE(s)) in BWP B, SRSs may collide during transmission at/in a specific SRS transmission timing/instance $n_{SRS}=l$. To prevent this case, the following rules may be considered.

Option 1: For UEs performing sounding in a greater BWP (i.e., BWP A), the BS may determine or search for an SRS frequency start position for SRS transmission through a frequency hopping pattern (or based on the frequency hopping pattern). If an SRS frequency start) position $\bar{k}_0^{(p)}$ is within a region overlapping with BWP B, the BS allocates the SRS BW to the first UE(s) at a position which has been allocated at/in an immediately previous SRS transmission timing/instance $n_{SRS}=l-1$. In this case, the position allocated at/in the immediately previous SRS transmission timing/instance $n_{SRS}=l-1$ may be the same position as a previous SRS BW resource and an SRS transmission count may be l-1 or l=1.

Option 2: For UEs performing sounding in a greater BWP (i.e., BWP A), the BS may determine or search for the SRS frequency start position for SRS transmission through the frequency hopping pattern (or based on the frequency hopping pattern). If the SRS frequency start position $\bar{k}_0^{(p)}$ is within a region overlapping with BWP B, the BS allocates the SRS BW to the first UE(s) at a position to be allocated at/in an immediately next SRS transmission timing/instance $n_{SRS}$ l+1.

Option 3: For UEs performing sounding in a greater BWP (i.e., BWP A), the BS may determine or search for the SRS frequency start position for SRS transmission through the frequency hopping pattern (or based on the frequency hopping pattern). If the SRS frequency start position $\bar{k}_0^{(p)}$ is within a region overlapping with BWP B, the UEs (i.e., first UE(s)) do not transmit the SRS at/in the SRS transmission timing/instance $n_{SRS}=l$. That is, the UEs drop SRS transmission at/in the SRS transmission timing/instance $n_{SRS}=l$.

Option 4: For UEs performing sounding in a greater BWP (i.e., BWP A), the BS may determine or search for the SRS frequency start position for SRS transmission through the frequency hopping pattern (or based on the frequency hopping pattern). If the SRS frequency start position $\bar{k}_0^{(p)}$ is within a region overlapping with BWP B, the BS searches for the SRS start position at/in the SRS transmission timing/instance $n_{SRS}=l$ and then changes the SRS transmission frequency start position to a position obtained by applying a predetermined frequency position offset value Δ to $\bar{k}_0^{(p)}$ (i.e., a position $k_0^{(p)} \pm \Delta$ obtained by adding or subtracting Δ to or from $\bar{k}_0^{(p)}$). The BS may allocate an SRS BW corresponding to the changed position $k_0^{(p)} \pm \Delta$ to the UEs (i.e., first UE(s)). The BS may transmit the predetermined frequency position offset value Δ to the UE through L3 (RRC), L2 (MAC-CE), or L1 (DCI).

Option 5: For UEs performing sounding in a greater BWP (i.e., BWP A), the BS may determine or search for the SRS frequency start position for SRS transmission through the frequency hopping pattern (or based on the frequency hopping pattern). If the SRS frequency start position $\bar{k}_0^{(p)}$ is within a region overlapping with BWP B, the BS determines an SRS BW position based on a predefined hopping pattern, i.e., a new hopping pattern, to apply the pattern in the case of collision. In this case, an SRS position allocated as a new hopping pattern is {BWP A}/{BWP B}, and may not be a frequency position in BWP B.

Proposal 2-5

Information about a configuration for selecting any one of the options of Proposal 2-4 above may be transmitted by the BS to the UE through L3 (RRC), L2 (MAC-CE), or L1 (DCI).

Proposal 2-6

To avoid collision of SRSs during transmission between UEs having different BWPs, the BS may predefine a range in which UEs having a greater BWP (e.g., BWP A) performs frequency hopping to exclude a region in a dependent BWP (e.g., BWP B).

Proposal 2-7 (Case in which at least partial frequency bands of BWP A and BWP B overlap)

When BWP B for a PUCCH and an SRS are frequency-division-multiplexed in BWP A (A∪B=A), if the BS allocates the SRS to certain UE(s) (first UE(s)) in entire BWP A and allocates the PUCCH to certain other UE(s) (second UE(s)) in BWP B, the SRS and the PUCCH may collide during transmission in a specific transmission instance $n_{SRS}=l$. To prevent such collision, the following predefined rules need to be considered.

Option 1: For UEs performing sounding in a greater BWP (i.e., BWP A), the BS may determine or search for an SRS frequency start position for SRS transmission through a frequency hopping pattern (or based on the frequency hopping pattern). If an SRS frequency start) position $\bar{k}_0^{(p)}$ is within a region overlapping with BWP B (PUCCH region), the BS allocates an SRS BW to the first UE(s) at a position which has been allocated at/in an immediately previous SRS transmission timing/instance $n_{SRS}=l-1$. In this case, the position at/in the immediately previous SRS transmission timing/instance $n_{SRS}$=l−1 may be the same position as a previous SRS BW resource and an SRS transmission count may be l−1 or l=1.

Option 2: For UEs performing sounding in a greater BWP (i.e., BWP A), the BS may determine or search for the SRS frequency start position for SRS transmission through the frequency hopping pattern (or based on the frequency hopping pattern). If the SRS frequency start position $\bar{k}_0^{(p)}$ is within a region overlapping with BWP B (PUCCH region), the BS allocates the SRS BW to the first UE(s) at a position to be allocated at/in an immediately next SRS transmission timing/instance $n_{SRS}$=l+1.

Option 3: For UEs performing sounding in a greater BWP (i.e., BWP A), the BS may determine or search for the SRS frequency start position for SRS transmission through the frequency hopping pattern (or based on the frequency hopping pattern). If the SRS frequency start position $\bar{k}_0^{(p)}$ is within a region overlapping with BWP B (PUCCH region), the UEs (i.e., first UE(s)) do not transmit the SRS at/in the SRS transmission timing/instance $n_{SRS}$=l. That is, the UEs (i.e., first UE(s)) drop SRS transmission at/in the SRS transmission timing/instance $n_{SRS}$=l.

Option 4: For UEs performing sounding in a greater BWP (i.e., BWP A), the BS may determine or search for an SRS frequency start position for SRS transmission through the frequency hopping pattern (or based on the frequency hopping pattern). If the SRS frequency start position $\bar{k}_0^{(p)}$ is within a region overlapping with BWP B, the BS searches for the SRS start position at/in the SRS transmission timing/instance $n_{SRS}$=l and then changes the SRS transmission frequency start position to a position obtained by applying a predetermined frequency position offset value $\Delta$ to $\bar{k}_0^{(p)}$ (i.e., a position $k_0^{(p)} \pm \Delta$ obtained by adding or subtracting $\Delta$ to or from $\bar{k}_0^{(p)}$). The BS may allocate an SRS BW corresponding to the changed position $k_0^{(p)} \pm \Delta$ to the UEs (i.e., first UE(s)). The BS may transmit the predetermined frequency position offset value $\Delta$ to the UE through L3 (RRC), L2 (MAC-CE), or L1 (DCI).

Option 5: For UEs performing sounding in a greater BWP (i.e., BWP A), the BS may determine or search for the SRS frequency start position for SRS transmission through the frequency hopping pattern (or based on the frequency hopping pattern). If the SRS frequency start position $\bar{k}_0^{(p)}$ is within a region overlapping with BWP B, the BS determines an SRS BW position based on a predefined hopping pattern, i.e., a new hopping pattern, to apply the pattern in the case of collision. In this case, an SRS position allocated as a new hopping pattern is {BWP A}/{BWP B}, and may not be a frequency position in BWP B.

Proposal 2-8

Information about a configuration for selecting any one of the options of Proposal 2-7 above may be transmitted by the BS to the UE through L3 (RRC), L2 (MAC-CE), or L1 (DCI).

Method of Transmitting SRS by UE According to Predefined Rule

Figure 11:
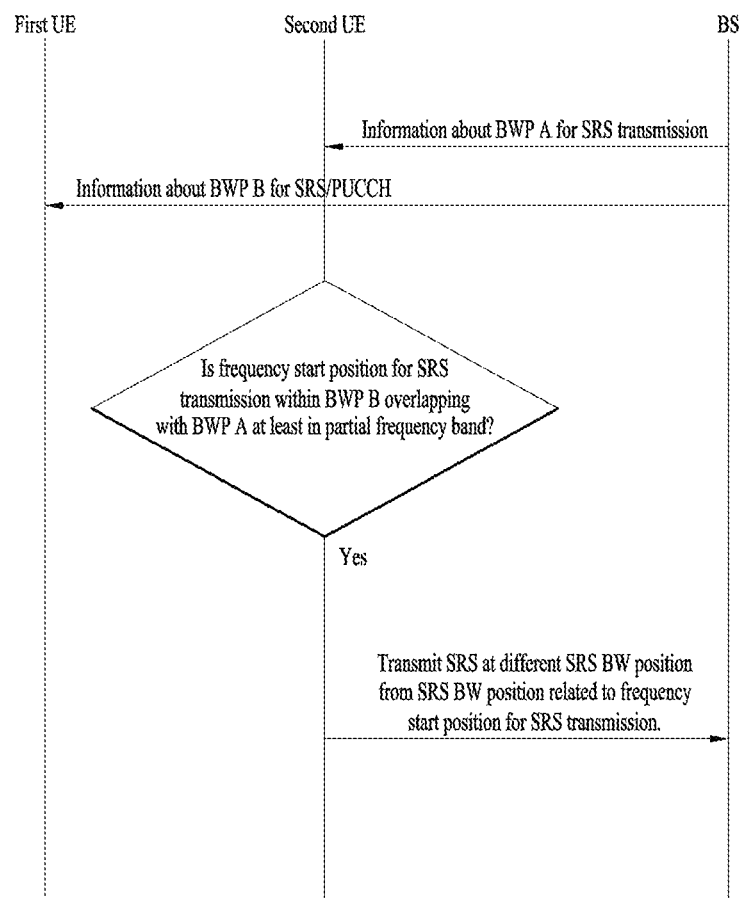
FIG. 11 is a diagram illustrating a method of transmitting the SRS by the UE according to a predefined rule described in Proposal 2-4 and Proposal 2-7.

FIG. 11 is a diagram illustrating a method of transmitting the SRS by the UE according to a predefined rule described in Proposal 2-4 and Proposal 2-7.

Referring to FIG. 11, a first UE may receive information about BWP A configured for SRS transmission thereof. A second UE may receive information about BWP B for the SRS or the PUCCH. If a frequency start position for SRS transmission, determined based on a frequency hopping pattern, is within the BWP B that overlaps with the BWP A at least in a partial frequency band, the first UE may transmit the SRS at a different SRS BW position from an SRS BW position related to the frequency start position for SRS transmission. Here, BWP B may be a BWP configured for SRS transmission for the second UE or may be a region for the PUCCH or a region allocated for the PUCCH. The different SRS BW position may correspond to an SRS BW position which has been allocated in a previous SRS transmission instance, correspond to an SRS BW position to be allocated in an immediately next SRS transmission instance, or correspond to an SRS BW position related to a new frequency start position for SRS transmission, calculated by applying a predetermined offset value to the frequency start position for SRS transmission determined based on the frequency hopping pattern. Although not illustrated in FIG. 11, the first UE may receive information about the predetermined offset value from the BS through RRC, MAC-CE, or DCI.

Proposal 3

To prevent an SRS BW configuration from increasing in the NR system, the BS may perform re-indexing on a subset for $C_{SRS}$ and $B_{SRS}$, which are NR SRS BW configurations, and inform. through a higher layer, the UE of indexes of $C'_{SRS}$ and $B'_{SRS}$ which are re-indexed. The BS may determine the subset for $C_{SRS}$ and $B_{SRS}$ based on sounding capability information reported by the UE. The UE may transmit candidates of $C_{SRS}$ and $B_{SRS}$ desired thereby to the BS as the sounding capability information.

Proposal 4

In the NR system, $B_{SRS}$ and $B_{SRS\_NR}$ in an SRS BW configuration may be integrated into one configuration, wherein indexes thereof may differ. $B_{SRS}$ and $C_{SRS}$ are linked. Here, an LTE SRS table and an NR SRS table are considered to be tree-like structures.

Table 13 below shows an SRS BW configuration in the LTE system (e.g., SRS BW configuration 1) in the case of a BWP of $80 < N_{RB}^{UL} \leq 110$ (i.e., BWP for the number of UL RBs which is greater than 80 and is equal to or less than 110). Table 14 shows an SRS BW configuration in the NR system (e.g., SRS BW configuration 1) in the case of a BWP of $180 < N_{RB}^{UL} \leq 200$ (i.e., BWP for the number of UL RBs which is greater than 180 and is equal to or less than 200).

TABLE 13

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS, 0}$ | $N_0$ | $m_{SRS, 1}$ | $N_1$ | $m_{SRS, 2}$ | $N_2$ | $m_{SRS, 3}$ | $N_3$ |
| 1 | 96 | 1 | 32 | 3 | 16 | 2 | 4 | 4 |

TABLE 14

| SRS bandwidth configuration | SRS-Bandwidth $B_{SRS} = -4$ | | SRS-Bandwidth $B_{SRS} = -3$ | | SRS-Bandwidth $B_{SRS} = -2$ | | SRS-Bandwidth $B_{SRS} = -1$ | |
|---|---|---|---|---|---|---|---|---|
| $C_{SRS}$ | $m_{SRS\_NR, 0}$ | $N_0$ | $m_{SRS\_NR, 1}$ | $N_1$ | $m_{SRS\_NR, 2}$ | $N_2$ | $m_{SRS\_NR, 3}$ | $N_3$ |
| 1 | 192 | 1 | 96 | 2 | 96 | 1 | 96 | 1 |

As an embodiment, $B_{SRS}$ may be $\{-4, -3, -2, -1, 0, 1, 2, 3\}$. If $B_{SRS}=3$ and $b_{hop}=-4$ ($b_{hop}<B_{SRS}$), frequency hopping may be performed on a total of 192 RBs with an SRS BW of 4 RBs. Here, a hopping pattern needs to be partially changed and may be represented by Equation 2 below.

$$F_b(n_{SRS}) = \begin{cases} (N_b/2)) \left\lfloor \dfrac{n_{SRS} \bmod \left| \prod_{b'=b_{hop}} N_{b'} \right|}{2 \left| \prod_{b'=b_{hop}}^{b-1} N_{b'} \right|} \right\rfloor + \left\lfloor \dfrac{n_{SRS} \bmod \left| \prod_{b'=b_{hop}}^{b} N_{b'} \right|}{2 \left| \prod_{b'=b_{hop}}^{b-1} N_{b'} \right|} \right\rfloor & \text{if } N_b \text{ even} \\ \lfloor N_b/2 \rfloor \left\lfloor n_{SRS} \Big/ \left| \prod_{b'=b_{hop}}^{b-1} N_{b'} \right| \right\rfloor & \text{if } N_b \text{ odd} \end{cases}$$

[Equation 2]

As another issue, the NR SRS may be transmitted by FDM with a long PUCCH and/or a shot PUCCH. Therefore, the SRS may not be allocated to the entire consecutive BWP.

Proposal 5

The BS may determine an SRS BW table for the SRS in the NR system through information about a long/short PUCCH position and an allocation region for a specific BWP and configure/transmit the determined SRS BW table for/to the UE. That is, when the entire BWP consists of α+β+γ, if a PUCCH resource region is β, the BS may allocate the SRS through two sounding BW tables. Each SRS BW table regards α and γ as one BWP and an SRS BW table corresponding to the BWP is used.

As an embodiment, when a BWP is 273 RBs and the PUCCH resource region ranges from 200 RBs to 220 RBs, an SRS BW table for a BWP of 200 RBs is used for an SRS configuration from 0 to 200 RBs and an SRS BW table for a BWP of 80 RBs is used for an SRS configuration from 220 to 273 RBs.

Proposal 5-1

Figure 12:
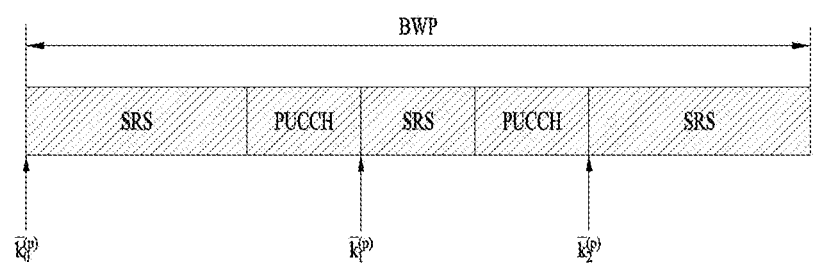
FIG. 12 is a diagram illustrating a configuration of three SRS start positions (in terms of a single UE. This configuration may be expanded)

FIG. 12 is a diagram illustrating a configuration of three SRS start positions (in terms of a single UE; this configuration may be expanded).

Resource start positions in divided SRS regions due to FDM with the PUCCH may be n positions $\overline{k}_0^{(p)}, \ldots, \overline{k}_n^{(p)}$ according to an FDM relationship with the PUCCH. These positions may be implicitly known through a PUCCH resource position configuration. Alternatively, the SRS resource start positions may be explicitly transmitted to the UE through L3 (RRC), L2 (MAC-CE), or L1 (DCI).

UE Transmitting SRS According to Predefined Rule when Multiple BWPs are Configured for One UE Proposal 6

When multiple BWPs are configured for one UE (e.g., BWP A and BWP B are configured for one UE), SRS configurations for the BWPs may be independently set. In this case, SRS resources configured for the BWPs for the UE may partially or totally overlap and then the SRS resources may collide. Therefore, it is necessary to determine priorities of SRS transmission resources in the (UL) BWPs configured for the UE.

SRS resources of BWPs having a high priority may be distinguished based on an SRS transmission behavior (aperiodic, semi-persistent, or periodic transmission), a BWP index priority, or an SRS configuration order. Accordingly, the following predetermined rules need to be considered in order to prevent collision.

Option 1: First, the SRS is allocated starting from an SRS resource of a BWP having a high priority and SRS resources are sequentially allocated according to priority. In this case, the BS may determine or search for an SRS frequency start position through a frequency hopping pattern on the SRS resource of a BWP having a high priority. Information about the SRS frequency start position may be transmitted to the UE by the BS through RRC signaling. When configuring an SRS resource of a BWP having a low priority, if an SRS frequency start (resource element (RE)) position $k_0^{(p)}$ is within a BWP (or BWPs) having a high priority, the BS allocates an SRS resource in SRS BW which has been allocated at/in an immediately previous SRS transmission timing/instance $n_{SRS}=l-1$ and the UE transmits the SRS in the SRS BW which has been allocated at/in the immediately previous SRS transmission timing/instance $n_{SRS}=l-1$.

Option 2: First, the SRS is allocated starting from an SRS resource of a BWP having a high priority and SRS resources are sequentially allocated according to priority. In this case, the BS may determine or search for an SRS frequency start position through a frequency hopping pattern on the SRS resource of a BWP having a high priority. Information about the SRS frequency start position may be transmitted to the UE by the BS through RRC signaling. When configuring an SRS resource of a BWP having a low priority, if the SRS frequency start (RE) position $\overline{k}_0^{(p)}$ is within a BWP (or BWPs) having a high priority, the BS allocates an SRS resource in an SRS BW to be allocated at/in an immediately next SRS transmission timing/instance $n_{SRS}=l+1$. In this case, the UE may transmit the SRS, which is a transmission count $n_{SRS}=l$, on an SRS BW resource corresponding to a frequency resource position to be allocated in the immediately next SRS transmission instance $n_{SRS}=l+1$.

Option 3: First, the SRS is allocated starting from an SRS resource of a BWP having a high priority and SRS resources are sequentially allocated according to priority. In this case, the BS may determine or search for an SRS frequency start position through a frequency hopping pattern on the SRS resource of a BWP having a high priority. Information about the SRS frequency start position may be transmitted to the UE by the BS through RRC signaling. When configuring an SRS resource of a BWP having a low priority, if the SRS frequency start (RE) position $k_0^{(p)}$ is within a BWP (or BWPs) having a high priority or partially overlaps with a BWP (or BWPs) having a high priority, the UE does not transmit an SRS resource (or SRS) of the corresponding BWP in the SRS transmission instance $n_{SRS}=1$.

Option 4: First, the SRS is allocated starting from an SRS resource of a BWP having a high priority and SRS resources are sequentially allocated according to priority. In this case, the BS may determine or search for an SRS frequency start position through a frequency hopping pattern on the SRS resource of a BWP having a high priority. Information about the SRS frequency start position may be transmitted to the UE by the BS through RRC signaling. When configuring an SRS resource of a BWP having a low priority, if the SRS frequency start (RE) position $k_0^{(p)}$ is within a BWP (or BWPs) having a high priority or partially overlaps with a BWP (or BWPs) having a high priority, the BS may search for the SRS start position in the SRS transmission instance $n_{SRS}=1$ and then change a sounding start position (SRS transmission frequency start position) to a position $k_0^{(p)} \pm \Delta$ obtained by applying a predetermined frequency position offset value $\Delta$ to $k_0^{(p)}$ (e.g., by adding or subtracting the predetermined frequency position value to or from $k_0^{(p)}$). The BS may transmit the predetermined frequency position offset value $\Delta$ to the UE through L3 (RRC), L2 (MAC-CE), or L1 (DCI).

Option 5: First, the SRS is allocated starting from an SRS resource of a BWP having a high priority and SRS resources are sequentially allocated according to priority. In this case, the BS may determine or search for an SRS frequency start position through a frequency hopping pattern on the SRS resource of a BWP having a high priority. Information about the SRS frequency start position may be transmitted to the UE by the BS through RRC signaling. When configuring an SRS resource of a BWP having a low priority, if the SRS frequency start (RE) position $k_0^{(p)}$ is within a BWP (or BWPs) having a high priority or partially overlaps with a BWP (or BWPs) having a high priority, the BS determines an SRS BW position using a new hopping pattern. In this case, an SRS position allocated as a new hopping pattern is {BWP A}/{BWP B}, and may not be a frequency position in BWP B.

Figure 13:
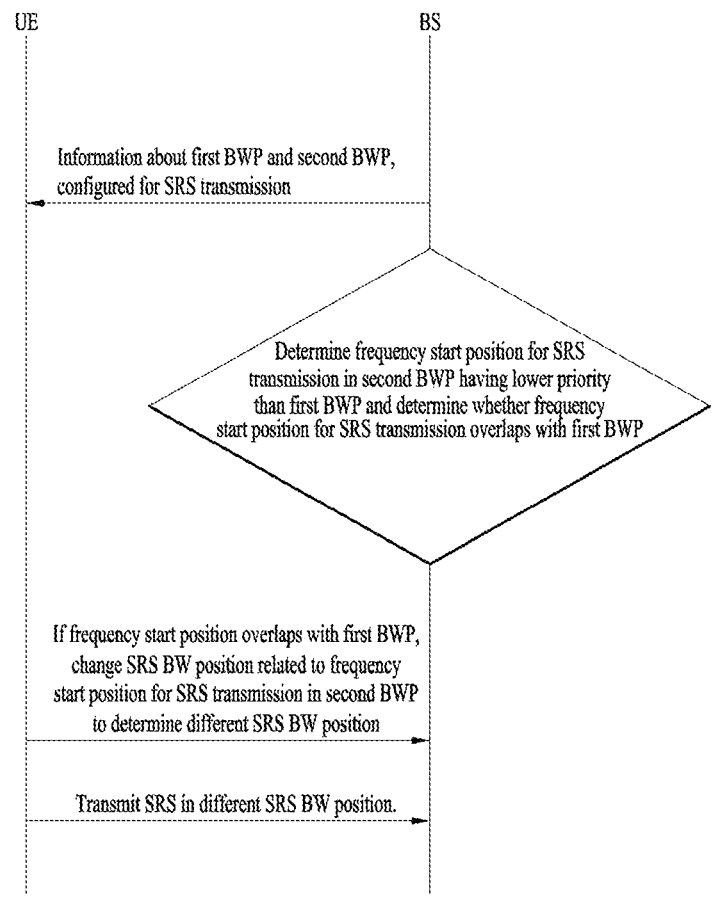
FIG. 13 is a diagram illustrating a procedure in which a BS receives an SRS and a UE transmits the SRS, when multiple BWPs are configured for one UE.

FIG. 13 is a diagram illustrating a procedure in which a BS receives an SRS and a UE transmits the SRS, when multiple BWPs are configured for one UE.

Method in which the BS Receives the SRS when Multiple BWPs are Configured for One UE in Relation to Proposal 6

Referring to FIG. 13, the BS may transmit information about multiple BWPs (e.g., information about a first BWP and a second BWP) for SRS transmission of the UE to the UE. Here, it is assumed that there are priorities between the first BWP and the second BWP and the first BWP has a higher priority than the second BWP. The BS determines a frequency start position for SRS transmission in the second BWP. The BS determines whether the frequency start position for SRS transmission in the second BWP having a lower priority than the first BWP is within the first BWP (or overlaps with the first BWP). Upon determining that the frequency start position for SRS transmission in the second BWP is within the first BWP or overlaps with the first BWP, the BS changes an SRS BW position related to the frequency start position for SRS transmission in the second BWP to allocate a different SRS BW position from the SRS BW position related to the frequency start position to the UE and transmits allocation information to the UE. Next, the BS may receive the SRS at the different SRS BW position from the UE.

The BS may allocate/determine, as the different SRS BW position, an SRS BW position to be allocated in the immediately next SRS transmission instance. Alternatively, the BS may calculate a new SRS transmission frequency start position for SRS transmission by applying a predetermined frequency start position offset value to the frequency start position for SRS transmission in the second BWP and allocate/determine an SRS BW position related to the new SRS transmission frequency start position as the different SRS BW position. The BS may transmit information about the predetermined frequency start position offset value to the UE.

Method in which One UE Transmits an SRS when Multiple BWPs are Configured for One UE in Relation to Proposal 6

Referring to FIG. 13, the UE may receive information about multiple BWPs (e.g., information about a first BWP and a second BWP) for SRS transmission of the UE from the BS. As described above, it is assumed that there are priorities between the first BWP and the second BWP and the first BWP has a higher priority than the second BWP. The BS determines a frequency start position for SRS transmission in the second BWP. If the frequency start position of the UE for SRS transmission in the second BWP is within the first BWP or overlaps with the first BWP, the UE may receive information about a different SRS BW position from an SRS BW position related to the frequency start position for SRS transmission in the second BWP. The UE may transmit the SRS in the second BWP at the different SRS BW position.

Here, the different SRS BW position may be an SRS BW position to be allocated in the immediately next SRS transmission instance. A new SRS transmission frequency start position for SRS transmission may be determined by applying a predetermined frequency start position offset value to the frequency start position for SRS transmission in the second BWP and the different SRS BW position may be an SRS BW position related to the new SRS transmission frequency start position. The UE may receive information about the predetermined frequency start position offset value from the BS.

While Proposal 6 has described the case in which an SRS resource position in the first BWP and an SRS resource position in the second BWP overlap, Proposal 6 may be equally applied to the case in which a PUCCH resource position in the first BWP and the SRS resource position in the second BWP overlap.

Figure 14:
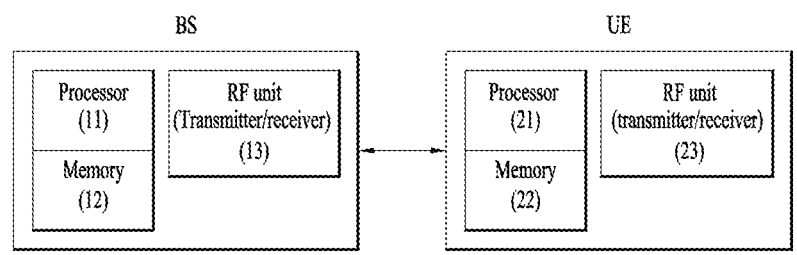
FIG. 14 is a block diagram illustrating elements of a UE and a BS for implementing the present disclosure.

FIG. 14 is a block diagram illustrating elements of a UE and a BS for implementing the present disclosure.

BS Receiving an SRS when Multiple BWPs are Configured for One UE in Relation to Proposal 6

Referring to FIG. 14, a transmitter 13 of the BS may transmit information about multiple BWPs (e.g., information about a first BWP and a second BWP) for SRS transmission of the UE to the UE. Here, it is assumed that there are priorities between the first BWP and the second BWP and the first BWP has a higher priority than the second BWP. A processor 11 of the BS determines a frequency start position for SRS transmission in the second BWP. The processor 11 of the BS determines whether the frequency start position for SRS transmission in the second BWP having a lower priority than the first BWP is within the first BWP (or overlaps with the first BWP). Upon determining that the frequency start position for SRS transmission in the second BWP is within the first BWP or overlaps with the first BWP, the processor 11 of the BS changes an SRS BW position related to the frequency start position for SRS transmission in the second BWP to allocate a different SRS BW position from the SRS BW position related to the frequency start position to the UE and transmits allocation information to the UE. Next, a receiver 13 of the BS may receive the SRS at the different SRS BW position from the UE.

The processor 11 of the BS may allocate/determine, as the different SRS BW position, an SRS BW position to be allocated in the immediately next SRS transmission instance. Alternatively, the processor 11 of the BS may calculate a new SRS transmission frequency start position for SRS transmission by applying a predetermined frequency start position offset value to the frequency start position for SRS transmission in the second BWP and allocate/determine an SRS BW position related to the new SRS transmission frequency start position as the different SRS BW position. The transmitter 13 of the BS may transmit information about the predetermined frequency start position offset value to the UE.

UE for Transmitting an SRS when Multiple BWPs are Configured for One UE in Relation to Proposal 6

Referring to FIG. 14, a receiver 23 of the UE may receive information about multiple BWPs (e.g., information about a first BWP and a second BWP) for SRS transmission of the UE from the BS. As described above, it is assumed that there are priorities between the first BWP and the second BWP and the first BWP has a higher priority than the second BWP. The processor 11 of the BS determines a frequency start position for SRS transmission in the second BWP. If the frequency start position of the UE for SRS transmission in the second BWP is within the first BWP or overlaps with the first BWP, the receiver 23 of the UE may receive information about a different SRS BW position from an SRS BW position related to the frequency start position for SRS transmission in the second BWP. The transmitter 23 of the UE may transmit the SRS in the second BWP at the different SRS BW position.

Here, the different SRS BW position may be an SRS BW position to be allocated in the immediately next SRS transmission instance. A new SRS transmission frequency start position for SRS transmission may be calculated by applying a predetermined frequency start position offset value to the frequency start position for SRS transmission in the second BWP and the different SRS BW position may be an SRS BW position related to the new SRS transmission frequency start position. The receiver 11 of the UE may receive information about the predetermined frequency start position offset value from the BS.

Hereinabove, a BW set configuration for a UE-specific BW configuration (e.g., a combination of $C_{SRS}$ and $B_{SRS}$) for sounding a wider BWP (up to 273 RBs) of NR as compared with LTE and an efficient method for an SRS BW configuration considering LTE SRS BW limitation (up to 96 RBs) have been described.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of transmitting and receiving the SRS and the communication apparatus therefor are applicable to various wireless communication systems such as a 3GPP LTE/LTE-A system and an NR (5G) system.

The invention claimed is:

1. A method of transmitting a sounding reference signal (SRS) by a user equipment (UE), the method comprising:
receiving information about a first bandwidth part (BWP) and a second BWP, configured for SRS transmission of the UE, from a base station (BS); and
transmitting the SRS to the BS in a first SRS bandwidth (BW) position,
wherein, based on overlap between the first BWP and a frequency start position for the SRS transmission in the second BWP having a lower priority than the first BWP, the first SRS BW position is different from a second SRS BW position related to the frequency start position for the SRS transmission.

2. The method of claim 1, wherein the first SRS BW position is related with an SRS BW position allocated in a previous SRS transmission instance.

3. The method of claim 1, wherein the first SRS BW position is related with an SRS BW position to be allocated in an immediately next SRS transmission instance.

4. The method of claim 1, wherein the first SRS BW position is related with an SRS BW position related to a new frequency start position for SRS transmission, calculated by applying a predetermined offset value to the frequency start position for the SRS transmission determined based on a frequency hopping pattern.

5. The method of claim 4, further comprising receiving information about the predetermined offset value from the BS.

6. A method of receiving a sounding reference signal (SRS) by a base station (BS), the method comprising:
transmitting information about a first bandwidth part (BWP) and a second BWP, configured for SRS transmission of a user equipment (UE), to the UE; and
receiving the SRS from the UE in a first SRS bandwidth (BW) position,
wherein, based on overlap between the first BWP and a frequency start position for the SRS transmission in the second BWP having a lower priority than the first BWP, the first SRS BW position is different from a second SRS BW position related to the frequency start position for the SRS transmission.

7. The method of claim 6, further comprising determining the frequency start position for the SRS transmission in the second BWP.

8. The method of claim 6, wherein the first SRS BW position is related with an SRS BW position allocated in a previous SRS transmission instance.

9. The method of claim 6, wherein the first SRS BW position is related with an SRS BW position to be allocated in an immediately next SRS transmission instance.

10. The method of claim 6, wherein the first SRS BW position is related with an SRS BW position related to a new frequency start position for SRS transmission, calculated by applying a predetermined frequency start position offset value to the frequency start position for the SRS transmission.

11. The method of claim 10, further comprising transmitting information about the predetermined frequency start position offset value to the UE.

12. The method of claim 6, further comprising
based on overlap between the first BWP and a frequency start position for the SRS transmission in the second BWP having a lower priority than the first BWP, allocating a second SRS BW for the SRS transmission at the first SRS BW position.

13. A user equipment (UE) for transmitting a sounding reference signal (SRS), the UE comprising:
a receiver configured to receive information about a first bandwidth part (BWP) and a second BWP, configured for SRS transmission of the UE, from a base station (BS); and
a transmitter configured to transmit the SRS to the BS in a first SRS bandwidth (BW) position,
wherein based on overlap between the first BWP and a frequency start position for the SRS transmission in the second BWP having a lower priority than the first BWP, the first SRS BW position is different from a second SRS BW position related to the frequency start position for the SRS transmission.

14. A base station (BS) for receiving a sounding reference signal (SRS), the BS comprising:
a transmitter configured to transmit information about a first bandwidth part (BWP) and a second BWP, configured for SRS transmission of a user equipment (UE), to the UE; and
a receiver configured to receive the SRS from the UE in a first SRS bandwidth (BW) position,
wherein based on overlap between the first BWP and a frequency start position for the SRS transmission in the second BWP having a lower priority than the first BWP, the first SRS BW position is different from a second SRS BW position related to the frequency start position for the SRS transmission.

15. The BS of claim 14, wherein the transmitter is further configured to transmit information about the first SRS BW position to the UE.

16. The method of claim 1, wherein the UE is capable of communicating with at least one of another UE, a UE related to an autonomous driving vehicle, a base station or a network.

* * * * *